(12) United States Patent
Guo et al.

(10) Patent No.: US 10,664,966 B2
(45) Date of Patent: May 26, 2020

(54) ANOMALY DETECTION USING IMAGE-BASED PHYSICAL CHARACTERIZATION

(71) Applicant: International Business Machines Corporation, Armonk, NY (US)

(72) Inventors: Dechao Guo, Niskayuna, NY (US);
Liying Jiang, Guilderland, NY (US);
Derrick Liu, Albany, NY (US);
Jingyun Zhang, Albany, NY (US);
Huimei Zhou, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 15/879,530

(22) Filed: Jan. 25, 2018

(65) Prior Publication Data
US 2019/0228519 A1    Jul. 25, 2019

(51) Int. Cl.
*G06K 9/00* (2006.01)
*G06K 9/62* (2006.01)
*G06K 9/40* (2006.01)
*G06T 7/00* (2017.01)
*G06N 20/00* (2019.01)
*G06K 9/46* (2006.01)
*G06F 16/28* (2019.01)

(52) U.S. Cl.
CPC .......... *G06T 7/0004* (2013.01); *G06K 9/4609* (2013.01); *G06K 9/6284* (2013.01); *G06N 20/00* (2019.01); *G06F 16/285* (2019.01); *G06K 9/00536* (2013.01)

(58) Field of Classification Search
USPC .......................... 382/141, 159, 254; 706/45
See application file for complete search history.

(56) References Cited

U.S. PATENT DOCUMENTS

| | | |
|---|---|---|
| 5,161,158 A | 11/1992 | Chakravarty et al. |
| 5,497,430 A | 3/1996 | Sadovnik et al. |

(Continued)

OTHER PUBLICATIONS

M. C. García-Alegre et al., "To an automatic visual inspection of egg-shell defects" International Workshop on Robotics & Automated Machinery for Bio-Robotics, 1997, pp. 255-260.

(Continued)

*Primary Examiner* — Kathleen Y Dulaney
(74) *Attorney, Agent, or Firm* — Cantor Colburn LLP; Vazken Alexanian

(57) ABSTRACT

An aspect of the invention includes reading a scale in image data representing an image of physical characteristics and resizing at least a portion of the image data to align with target image data representing a target image based at least in part on the scale to form resized image data representing one or more resized images. Noise reduction is applied to the resized image data to produce test image data representing one or more test images. A best fit analysis is performed on the test image data with respect to the target image data. Test image data having the best fit are stored with training image data representing classification training images indicative of one or more recognized features. An anomaly in unclassified image data representing an unclassified image is identified based at least in part on an anomaly detector as trained using the classification training images.

18 Claims, 10 Drawing Sheets

(56) References Cited

U.S. PATENT DOCUMENTS

| | | | |
|---|---|---|---|
| 6,504,948 B1 | 1/2003 | Schemmel et al. | |
| 6,714,925 B1* | 3/2004 | Barnhill | G06K 9/6228 |
| | | | 706/48 |
| 6,789,069 B1* | 9/2004 | Barnhill | G06K 9/623 |
| | | | 706/12 |
| 7,318,051 B2* | 1/2008 | Weston | G06K 9/6215 |
| | | | 706/12 |
| 7,904,845 B2 | 3/2011 | Fouquet et al. | |
| 8,455,821 B2 | 6/2013 | Arjavac et al. | |
| 8,554,703 B1* | 10/2013 | Lin | G06N 20/00 |
| | | | 706/12 |
| 8,595,154 B2* | 11/2013 | Breckenridge | G06N 20/00 |
| | | | 706/12 |
| 9,158,965 B2 | 10/2015 | Li et al. | |
| 9,436,760 B1 | 9/2016 | Tacchi et al. | |
| 2002/0165837 A1* | 11/2002 | Zhang | G06K 9/623 |
| | | | 706/16 |
| 2002/0174344 A1* | 11/2002 | Ting | G06F 21/32 |
| | | | 713/185 |
| 2003/0229278 A1* | 12/2003 | Sinha | G06K 9/6247 |
| | | | 600/407 |
| 2005/0216426 A1* | 9/2005 | Weston | G06K 9/6215 |
| | | | 706/12 |
| 2008/0215513 A1* | 9/2008 | Weston | G06N 20/00 |
| | | | 706/13 |
| 2008/0300809 A1* | 12/2008 | Yang | G06T 7/0006 |
| | | | 702/81 |
| 2010/0205124 A1* | 8/2010 | Ben-Hur | G06K 9/6215 |
| | | | 706/12 |
| 2014/0267219 A1* | 9/2014 | Jain | G06K 9/00221 |
| | | | 345/418 |
| 2015/0169393 A1* | 6/2015 | Shibuya | G06F 11/00 |
| | | | 702/182 |
| 2015/0242686 A1* | 8/2015 | Lenka | G06F 16/51 |
| | | | 382/103 |
| 2016/0189003 A1* | 6/2016 | Liu | G06F 16/5838 |
| | | | 382/155 |
| 2016/0189055 A1* | 6/2016 | Zvitia | G06N 20/00 |
| | | | 706/11 |
| 2016/0203386 A1* | 7/2016 | Porecki | G06K 9/00677 |
| | | | 382/159 |
| 2016/0300351 A1* | 10/2016 | Gazit | G06T 7/11 |
| 2017/0046616 A1* | 2/2017 | Socher | G06N 3/088 |
| 2018/0181804 A1* | 6/2018 | Sarraf | G06K 9/00409 |
| 2019/0147127 A1* | 5/2019 | Su | G03F 7/705 |

OTHER PUBLICATIONS

R. L. Radojević et al., "Digital parameterization of apple fruit size, shape and surface spottiness," African Journal of Agricultural Research, vol. 6, No. 13, 2011, pp. 3131-3142.

R. Ranjan et al., "Classification and identification of surface defects in friction stir welding: An image processing approach," Journal of Manufacturing Processes, vol. 22, 2016, pp. 237-253.

List of IBM Patents or Patent Applications Treated as Related, Mar. 18, 2020, 2 pages.

U.S. Appl. No. 16/822,471, filed Mar. 18, 2020, Entitled: Anomaly Detection Using Image-Based Physical Characterization, First Named Inventor: Dechao Guo.

* cited by examiner

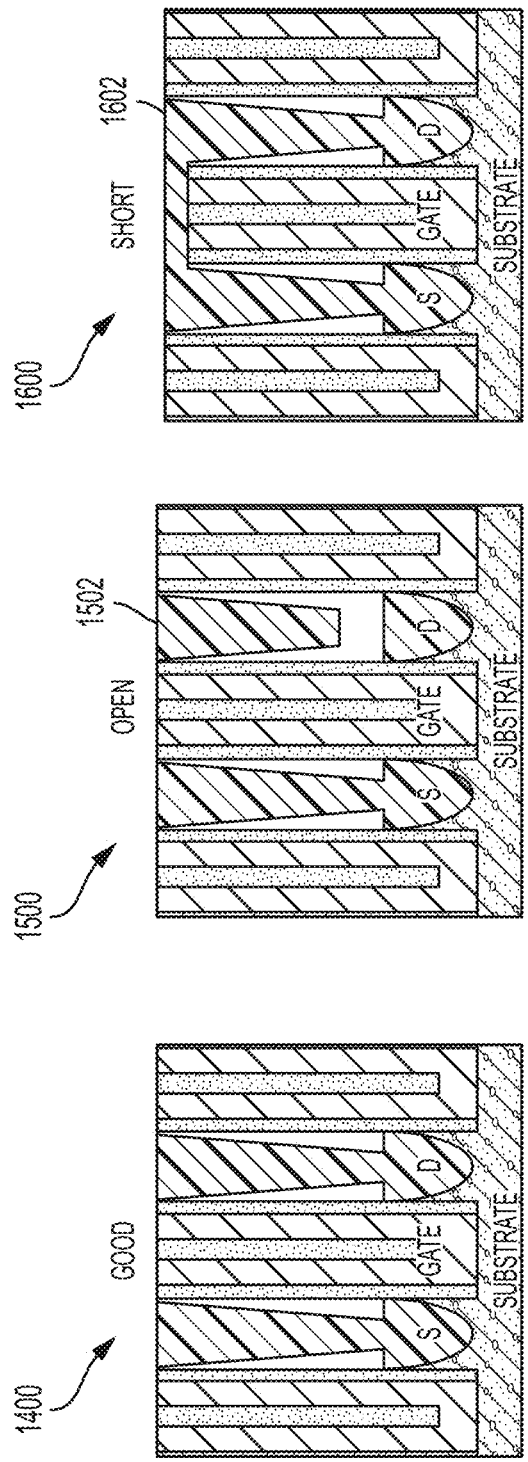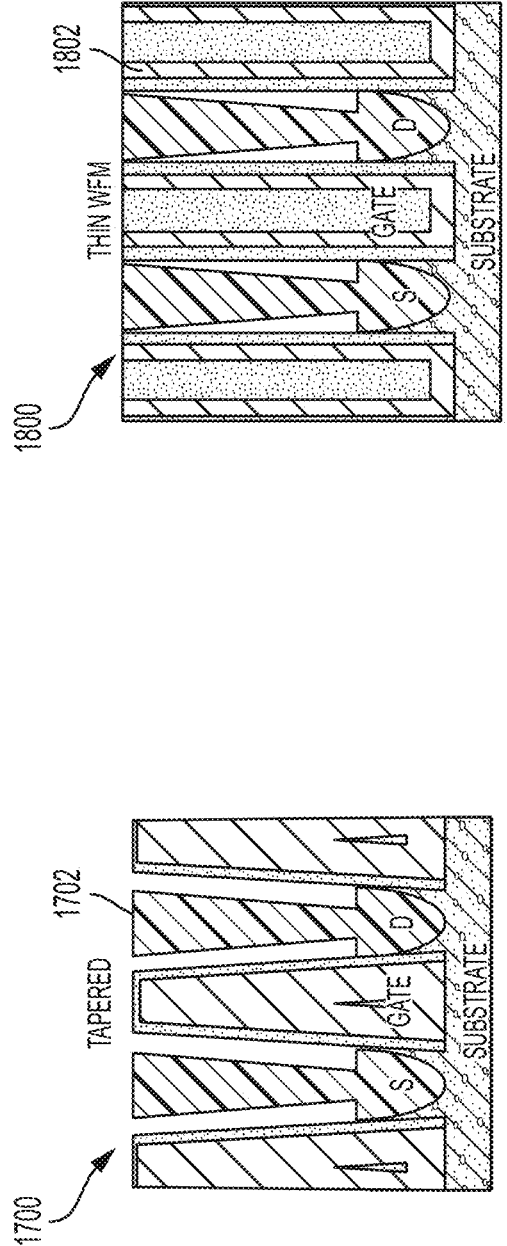

ANOMALY DETECTION USING IMAGE-BASED PHYSICAL CHARACTERIZATION

BACKGROUND

The present invention relates to component inspection, and more specifically, to anomaly detection using image-based physical characterization.

Visual inspection methods can capture images for components to be inspected and determine pass/fail criteria or identify whether one or more various anomaly types are present. In complex systems, there can be many components to inspect for a wide range of anomalies. Images can be captured under different conditions depending upon an operator, image capturing devices used, and other such factors.

SUMMARY

Embodiments of the present invention are directed to a computer-implemented method for anomaly detection. A non-limiting example of the method includes reading, by a processor, a scale in image data representing an image of a plurality of physical characteristics. The processor resizes at least a portion of the image data to align with target image data representing a target image of one or more structures based at least in part on the scale to form resized image data representing one or more resized images. The processor applies noise reduction to the resized image data to produce test image data representing one or more test images and performs a best fit analysis on the test image data with respect to the target image data. Test image data of at least one of the test images having the best fit are stored with training image data representing a plurality of classification training images indicative of one or more recognized features. An anomaly in unclassified image data representing an unclassified image is identified based at least in part on an anomaly detector as trained using the classification training images.

Embodiments of the present invention are directed to a computer program product for anomaly detection. The computer program product includes a computer readable storage medium readable by a processing circuit and storing program instructions for execution by the processing circuit for performing a method. A non-limiting example of the method includes reading a scale in image data representing an image of a plurality of physical characteristics and resizing at least a portion of the image data to align with target image data representing a target image of one or more structures based at least in part on the scale to form resized image data representing one or more resized images. Noise reduction is applied to the resized image data to produce test image data representing one or more test images. A best fit analysis is performed on the test image data with respect to the target image data. Test image data of at least one of the test images having the best fit are stored with training image data representing a plurality of classification training images indicative of one or more recognized features. An anomaly in unclassified image data representing an unclassified image is identified based at least in part on an anomaly detector as trained using the classification training images.

Embodiments of the present invention are directed to a processing system for anomaly detection. The processing system includes one or more types of memory and at least one processor communicatively coupled with the one or more types of memory. The at least one processor is configured to perform a method. A non-limiting example of the method includes reading a scale in image data representing an image of a plurality of physical characteristics and resizing at least a portion of the image data to align with target image data representing a target image of one or more structures based at least in part on the scale to form resized image data representing one or more resized images. Noise reduction is applied to the resized image data to produce test image data representing one or more test images. A best fit analysis is performed on the test image data with respect to the target image data. Test image data of at least one of the test images having the best fit are stored with training image data representing a plurality of classification training images indicative of one or more recognized features. An anomaly in unclassified image data representing an unclassified image is identified based at least in part on an anomaly detector as trained using the classification training images.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 14 depicts a schematic illustration of a post-processed image identified as good according to one or more embodiments of the present invention;

FIG. 15 depicts a schematic illustration of a post-processed image identified as an open circuit according to one or more embodiments of the present invention;

FIG. 16 depicts a schematic illustration of a post-processed image identified as a short circuit according to one or more embodiments of the present invention;

FIG. 17 depicts a schematic illustration of a post-processed image identified as a tapered structure according to one or more embodiments of the present invention; and FIG. 18 depicts a schematic illustration of a post-processed image identified as having thin work function metal according to one or more embodiments of the present invention.

Figure 1:
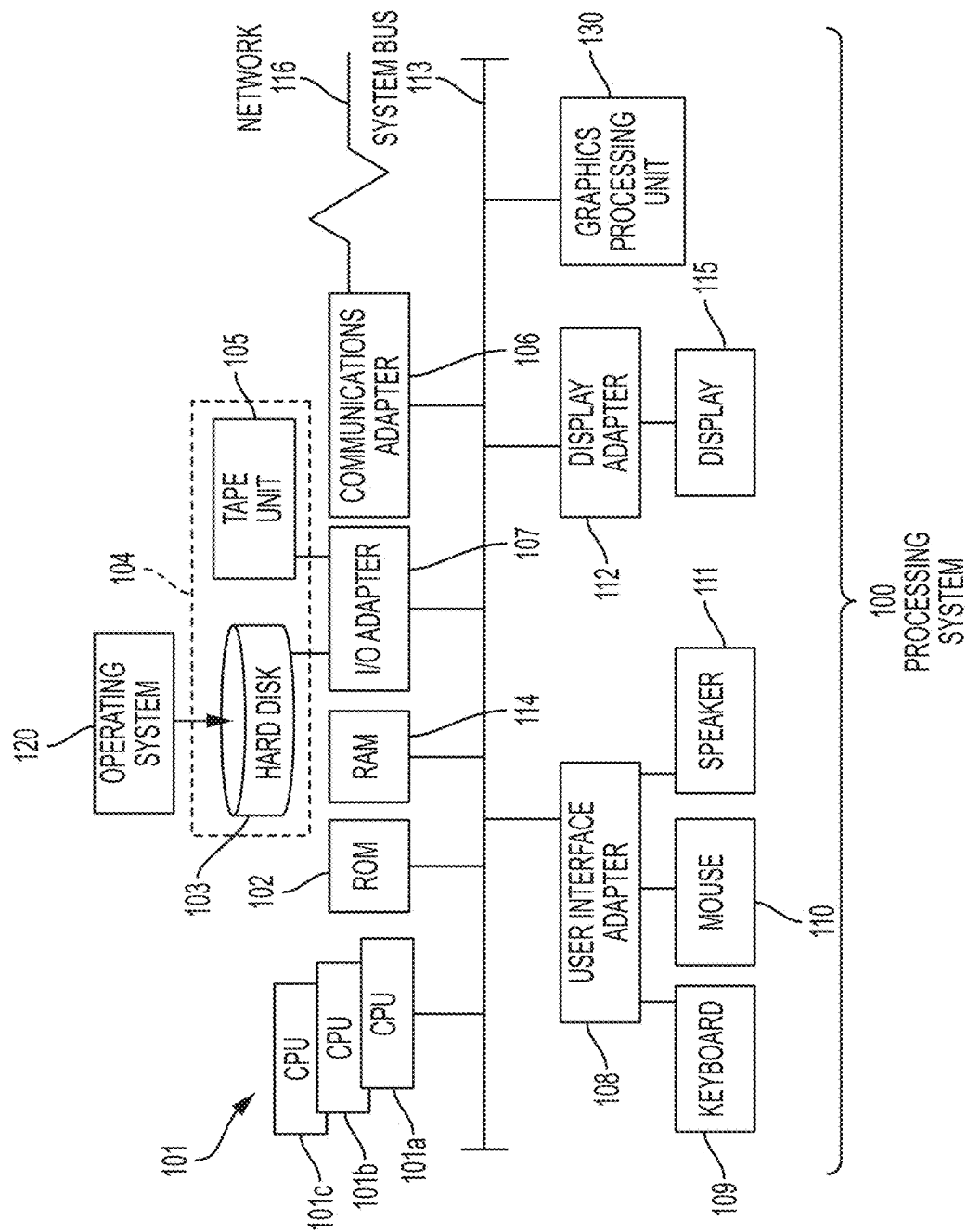
FIG. 1 depicts a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a number of challenges can arise in performing recognition of physical characteristics in digital images. For example, when using a target image to compare with other images to identify similar features, there can be differences due to image rotation, image scale, image resolution, image noise, image intensity, and other such differences. Further, known visual recognition techniques that work well with color images cannot work well with gray-scale images (also referred to as black-and-white images). Some image capturing techniques use alternatives to visible light, such as X-ray based imaging or transmission electron microscopy (TEM). These alternative image capturing techniques can include a larger degree of noise or blurriness as compared to cameras that operate in the visible light spectrum.

Turning now to an overview of the aspects of the invention, one or more embodiments of the invention address the above-described shortcomings of the prior art by providing processing of images with varying resolution and orientation for developing training sets of various identified physical characteristics to support anomaly detection using machine learning. A number of sample images can be captured from an imaging device with sub-images extracted and normalized to construct a training image repository of classification training images that best fit a target image of one or more structures. The best fit can be determined by performing a best fit analysis. In embodiments of the invention, the best fit analysis can include image shifting and/or rotation. The process can be repeated for multiple target images having various physical characteristics indicative of "good" and anomalous features to collect groups of corresponding classification training images. Once image processing and collection of classification training images are performed, an anomaly detector can be trained using machine learning based at least in part on the training image repository. After training, the anomaly detector can be used to identify one or more anomalies in an unclassified image, for instance, during a visual inspection process of a component or article under analysis.

The above-described aspects of the invention address the shortcomings of the prior art by combining a number of image processing approaches to build a normalized training set for machine learning to support an anomaly detector. For example, identification of scaling information on an image itself can support resizing/rescaling of images. Random sampling of images by taking cuts proportional to a target image, along with noise reduction can be used to generate multiple test images from an original image. A test image most closely aligning to a target image can be identified by rotation and performing a best fit comparison, which can include image shifting and/or rotation. Multiple iterations can be performed to develop the training image repository of classification training images for test images indicative of recognized features with multiple classified physical characteristics. Technical benefits include enhanced anomaly detection for various physical characteristics captured in image data. The described processes can efficiently analyze gray-scale images, such as TEM images, where color image processing techniques are not as effective and would typically require a larger number of training sets as compared to embodiments described herein.

Turning now to a more detailed description of aspects of the present invention, FIG. 1 depicts a processing system 100 according to embodiments of the invention. In the example of FIG. 1, the system 100 has one or more central processing units (processors) 101a, 101b, 101c, etc. (collectively or generically referred to as processor(s) 101). Each processor 101 can include a reduced instruction set computer (RISC) microprocessor. Processors 101 are coupled to system memory 114 and various other components via a system bus 113. Read only memory (ROM) 102 is coupled to the system bus 113 and can include a basic input/output system (BIOS), which controls certain basic functions of system 100.

FIG. 1 further depicts an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which can include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1. The processing system 100 can execute instructions to perform a number of processes as further described herein and can be incorporated in one or more image processing systems.

Figure 2:
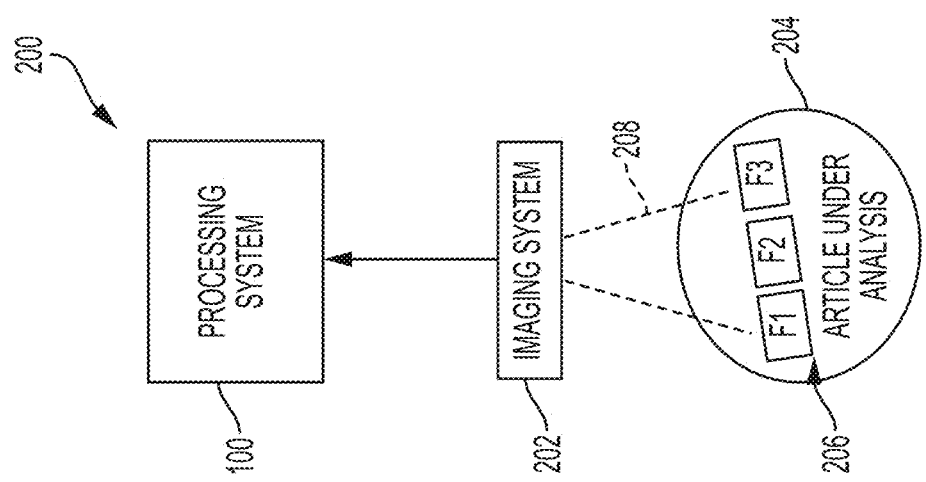
FIG. 2 depicts a system according to embodiments of the present invention.

FIG. 2 depicts an image processing system 200 that includes the processing system 100 of FIG. 1. The image processing system 200 includes an imaging system 202 that is communicatively coupled to the processing system 100 using, for example, wired, wireless, or optical coupling. In the example of FIG. 2, the imaging system 202 can include any type of imaging device operable to record scaling information within captured images. The imaging system 202 can capture images of an article under analysis 204 including one or more features 206 (e.g., F1, F2, F3). The features 206 include physical characteristics that are at least partially observable in images captured by the imaging system 202. The features 206 can be separate components, interconnected components, or portions of the same component as part of the article under analysis 204. As one example, the features 206 are portions of one or more electronic devices. The imaging system 202 can capture images as gray-scale images of varying scale and/or resolution. The orientation of the features 206 can vary depending on placement of the article under analysis 204 relative to a field of view 208 of the imaging system 202 and/or the underlying structure of the features 206.

Figure 3:
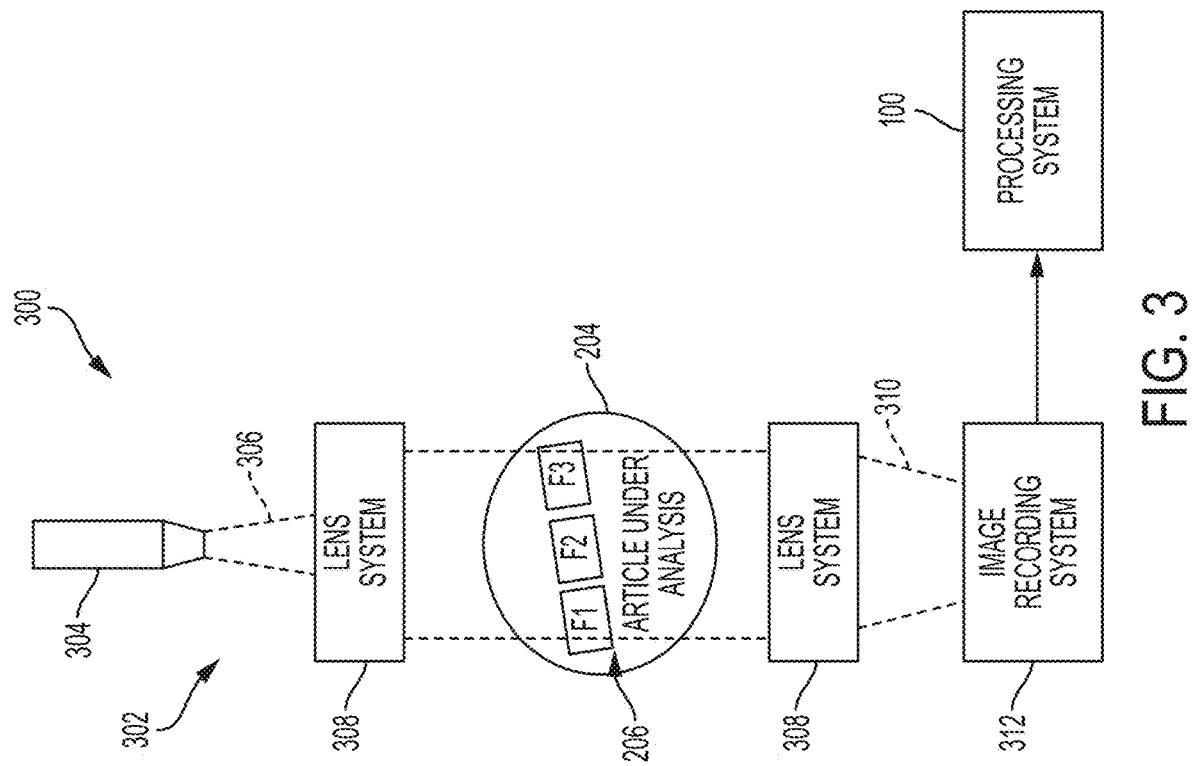
FIG. 3 depicts a system according to embodiments of the present invention.

FIG. 3 depicts an image processing system 300 according to an alternate embodiment. The image processing system 300 includes the processing system 100 of FIG. 1 and an imaging system 302. In contrast to the direct viewing configuration of FIG. 2, the imaging system 302 is a pass-through imager, where an emission source 304 emits an imaging beam 306 through one or more lens systems 308 and the features 206 of the article under analysis 204 with a resulting field of view 310 captured by an image recording system 312. The image recording system 312 is communicatively coupled to the processing system 100 using, for example, wired, wireless, or optical coupling. When embodied as a TEM system, the emission source 304 can be an electron gun. The lens systems 308 can include a combination of one or more objective lens, diffraction lens, intermediate lens, and projector lens, including optical and/or magnetic lenses. The image recording system 312 can use film-based, charge-coupled device based image sensing, and/or other image sensing technologies known in the art. The imaging system 302 can capture images as gray-scale images of varying scale and/or resolution.

Figure 4:
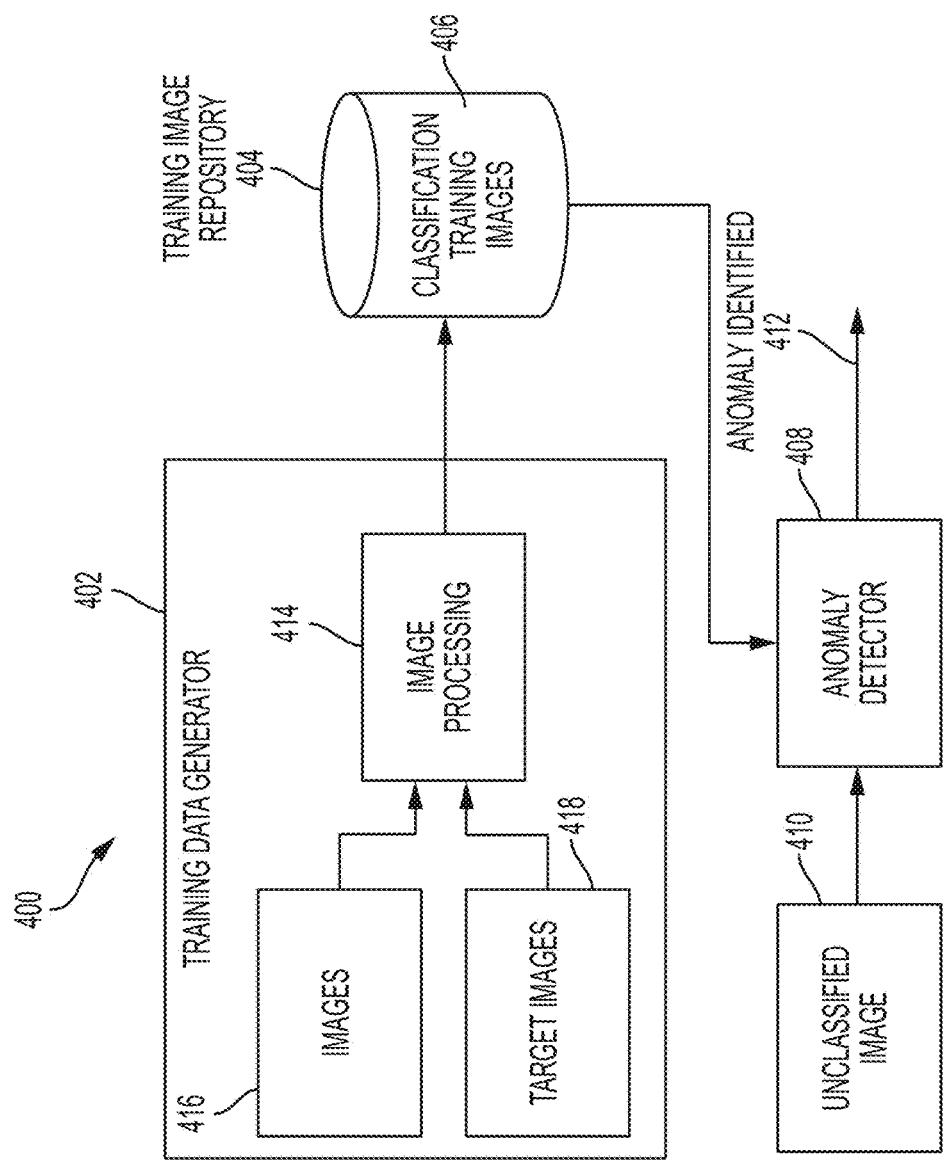
FIG. 4 depicts a data flow according to one or more embodiments of the present invention.

FIG. 4 depicts a data flow 400 of processing that can be performed by the processing system 100 of FIG. 1 as part of the image processing system 200, 300 of FIGS. 2 and 3. Alternatively, a portion of the data flow 400 can be distributed between multiple instances of the processing system 100 and can be performed at different periods of time. The data flow 400 includes a training data generator 402 that develops a training image repository 404 of classification training images 406 used to train an anomaly detector 408 using machine learning. For example, a TEM image can show a fin structure surrounded by shallow trench isolation (STI). The classification training images 406 can include normalized images that depict examples of fin structures with STI having various physical characteristics. Training of the anomaly detector 408 using one or more known machine learning techniques can enable the anomaly detector 408 to classify a similar structure as a fin and a surrounded structure as STI when examining an unclassified image 410. If there is any void at the STI, the anomaly detector 408 can recognize the void as abnormal at the STI and report an anomaly 412 identified after training. After the anomaly detector 408 is trained, the anomaly detector 408 can continue to analyze one or more unclassified image 410 of the article under analysis 204 including one or more features 206 to determine whether an anomaly 412 is identified. The one or more unclassified image 410 can be captured by the imaging system 202, 302 of FIGS. 2 and 3. The instance of the article under analysis 204 analyzed by the anomaly detector 408 can be different than one or more images of the article under analysis 204 used as images 416 and target images 418 by the training data generator 402.

The training data generator 402 can perform image processing 414 using one or more images 416 of the article under analysis 204 that include various physical characteristics. The image processing 414 can perform normalization operations to better align features of the images 416 with one or more target images 418. Upon performing normalization and best fit matching between the images 416 and target images 418, the image processing 414 outputs classification training images 406 for storage in the training image repository 404. Further details of the image processing 414 and identification of one or more anomaly 412 are described in reference to FIGS. 5A and 5B.

Figure 5A:
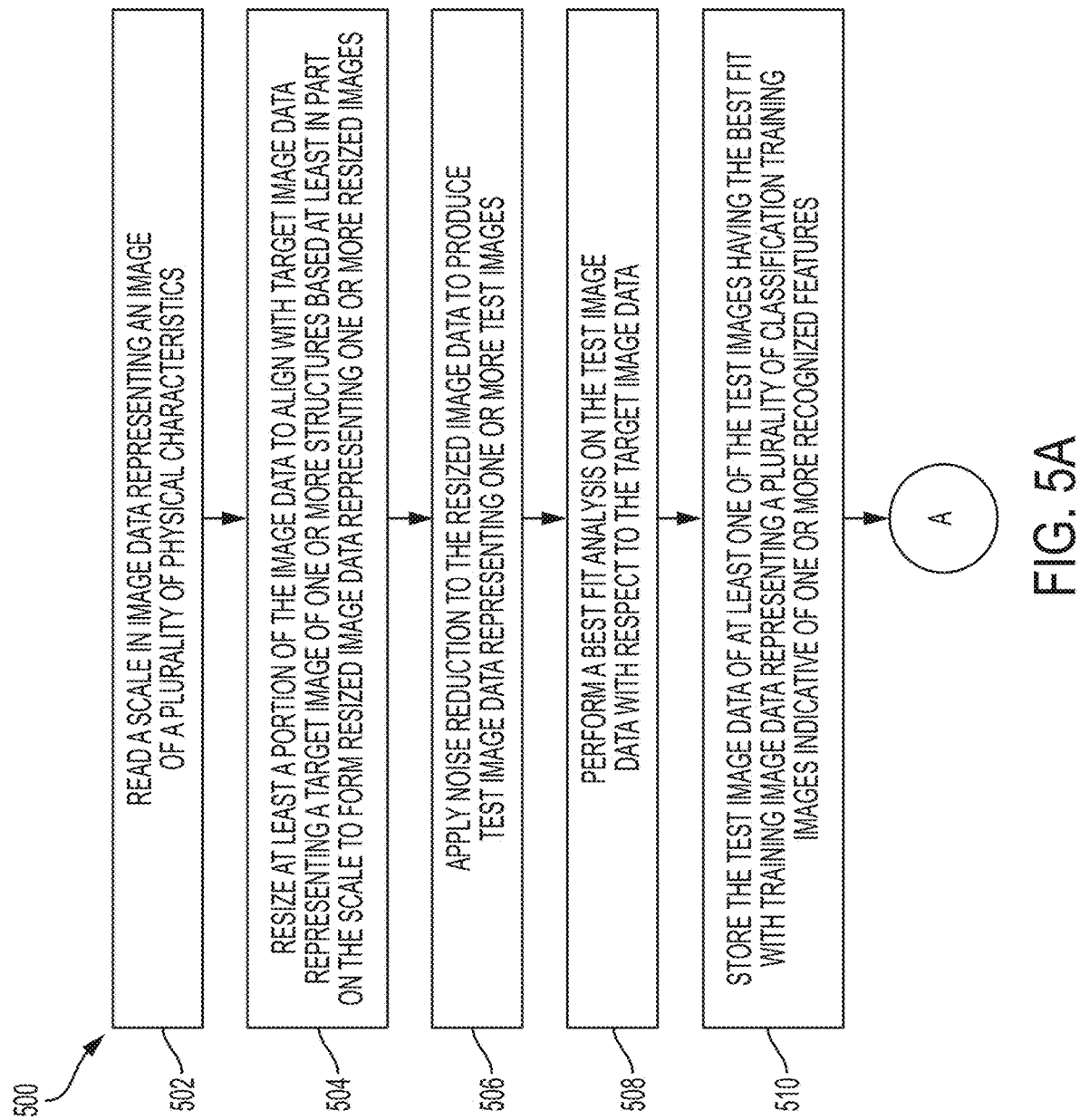
FIG. 5A depicts a portion of a process for anomaly detection according to one or more embodiments of the present invention.
Figure 5B:
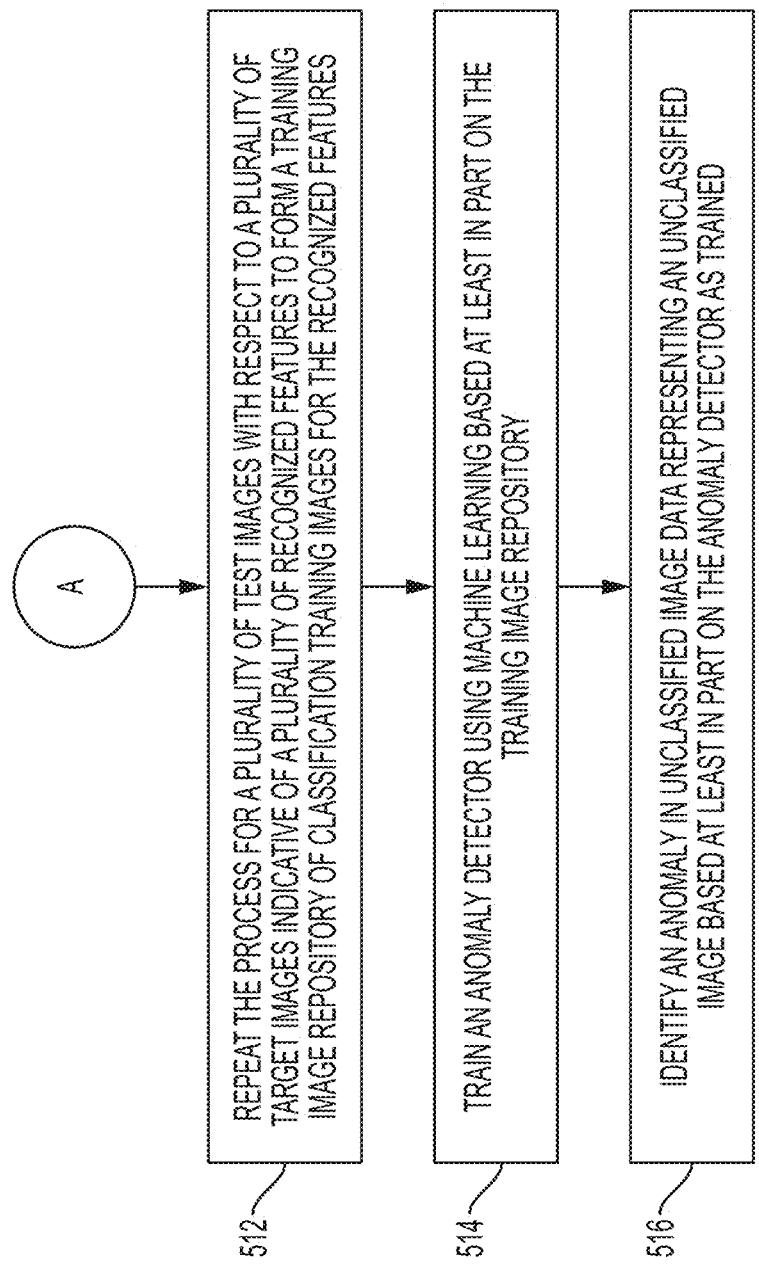
FIG. 5B depicts a portion of a process for anomaly detection according to one or more embodiments of the present invention.

Referring now to FIGS. 5A and 5B, a flow chart illustrating an exemplary process 500 for anomaly detection according to one or more embodiments of the present invention is shown. FIGS. 5A and 5B are described with respect to FIGS. 1-4 and can be performed by the processing system 100 as part of the image processing system 200, 300 of FIGS. 2 and 3. Further one or more portions of the process 500 can be distributed between multiple physical and/or virtual machines. In embodiments, processor 101 of the processing system 100 can refer to physical or virtual processing resources on the same or different physical or virtual machines. The process 500 is further described with respect to example images depicted in FIGS. 6-18.

Figure 6:
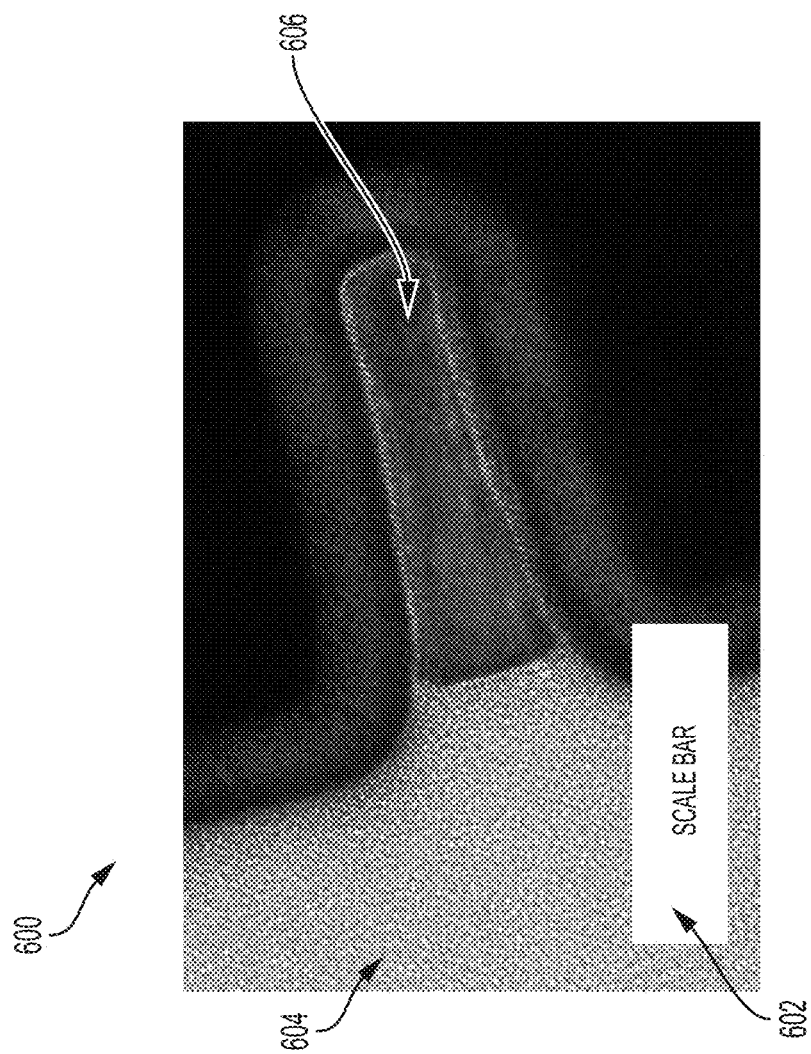
FIG. 6 depicts an example image for analysis according to one or more embodiments of the present invention.

At block 502, processor 101 can read a scale in image data representing an image 600 of FIG. 6 of a plurality of physical characteristics as one or more of the images 416 captured by the imaging system 202, 302 as part of the image processing 414. The image 600 can include a scale bar 602 that graphically depicts relative physical sizes of various portions of the image 600. In the example of FIG. 6, the image 600 includes a substrate 604 and a gate fin 606 as a gray-scale image with noise as can be acquired by image processing system 300, where the article under analysis 204 includes a plurality of electronic structures as features 206. In some embodiments, the image processing 414 can determine the scale of the image 600 by reading pixel data of the image data representing image 600 into a two-dimensional matrix, dissecting the two-dimensional matrix to retain a portion of the image data expected to graphically depict scaling information (e.g., lower left corner), and analyzing the portion of the image data expected to graphically depict scaling information. For instance, if the scale bar 602 includes a physical length and a numerical size value, the image processing 414 can use the information depicted in the scale bar 602 (from the portion of the image 600 expected to graphically depict scaling information) to build a training set of data to recognize a plurality of different legend labels. Thus, a training set can be collected for examples such as a 10 nm scale, a 20 nm scale, a 100 nm scale, and so forth.

Figure 7:
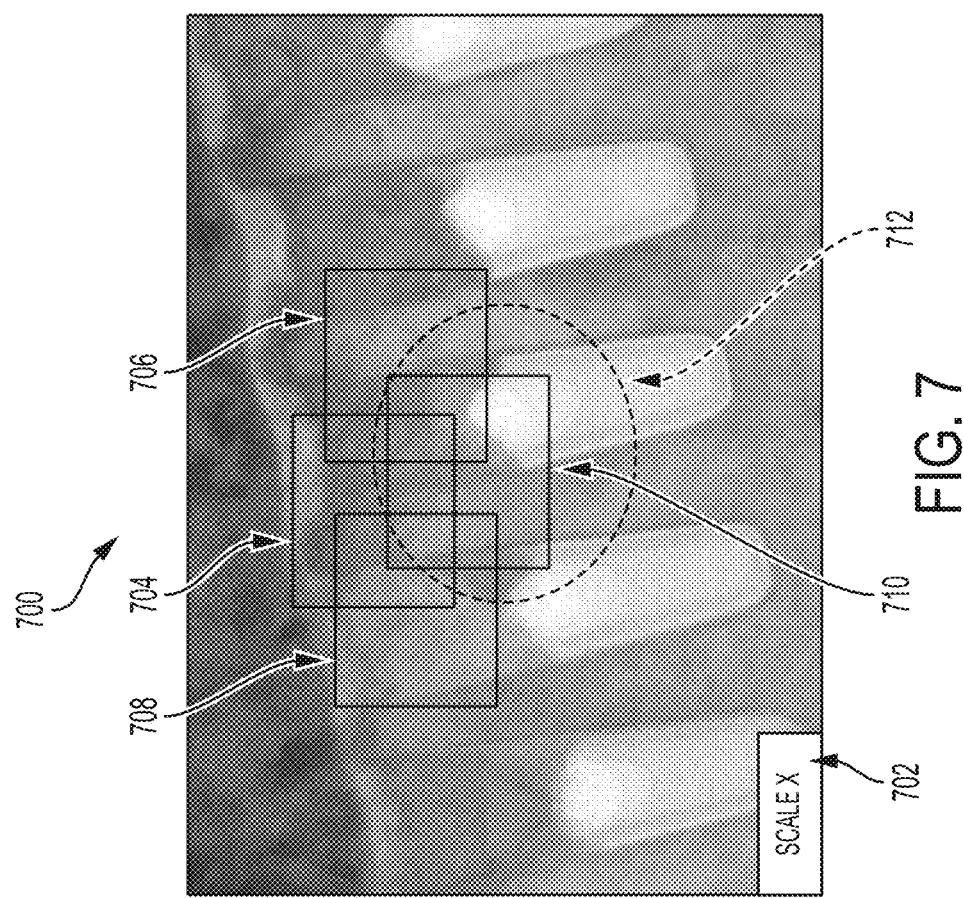
FIG. 7 depicts an image cut example of an image according to one or more embodiments of the present invention.

In embodiments, processor 101 can extract a plurality of image cuts from the image data representing image 600 as part of the image processing 414. As an example, image 700 of FIG. 7 can be one of the images 416 with a scale bar 702 similar to the scale bar 602 of FIG. 6. Image cuts 704, 706, 708, 710 can be extracted from the image data representing image 700 by identifying a central portion 712 of the image 700 and randomly selecting a plurality of image blocks in proximity to the central portion 712 of the image 700. Although four image cuts 704-710 are depicted in the example of FIG. 7, it will be understood that any number of two or more image cuts 704-710 can be extracted.

Figure 8:
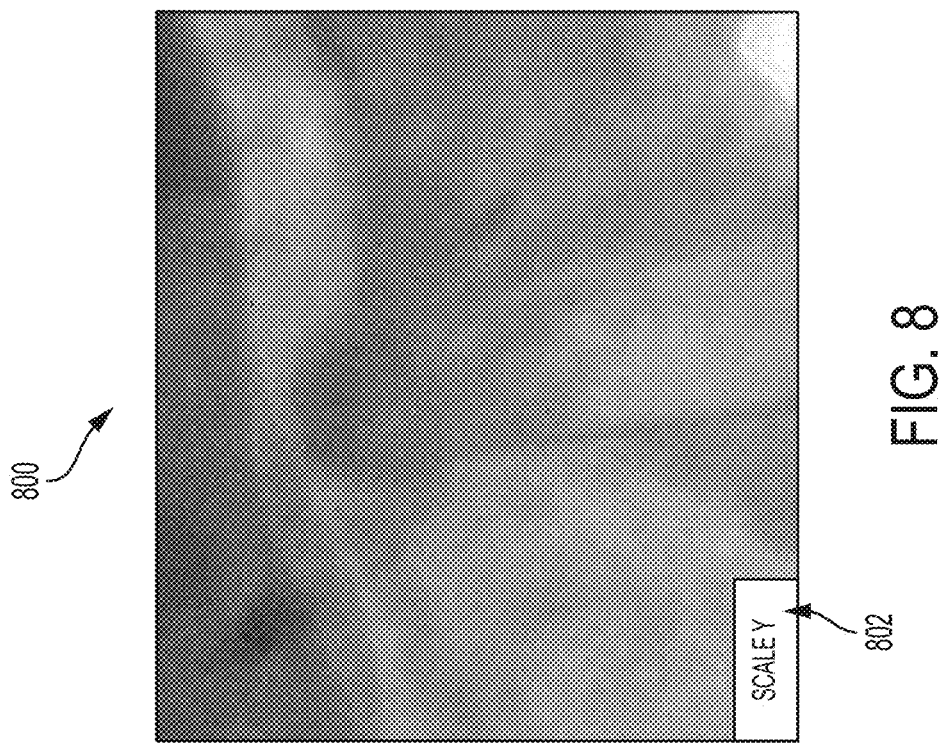
FIG. 8 depicts a target image for analysis according to one or more embodiments of the present invention.

At block 504, processor 101 can resize at least a portion of the image data representing image 700, such as the image cuts 704-710, to align with image data representing a target image 800 of FIG. 8 (e.g., one of the target images 418) of one or more structures based at least in part on the scale to form resized image data representing one or more resized images as part of the image processing 414. The target image 800 can also include a scale bar 802, similar to the scale bar 702 but have a different scale value. The image processing 414 can perform resizing, for instance, by selecting a size of the image blocks to match a pixel count of the target image 800. As one example, a ratio of the scale bar 702 to the scale bar 802 can be determined and used for selecting area sizes for each of the image cuts 704-710. For instance, the scaling of image 700 can be four times larger, eight times larger, ten times larger, etc. than the target image 800. Resolution adjustments can be made to better match pixel count with physical sizing between the image cuts 704-710 and the target image 800.

At block 506, processor 101 can apply a noise reduction to the resized image data representing one or more resized images (e.g., rescaled image cuts 704-710) to produce test image data representing a plurality of test images 904, 906, 908, 910 of FIGS. 9, 10, 11, and 12 as part of the image processing 414. In the example of FIGS. 9-12, a minor noise reduction is performed. In some embodiments, noise reduction includes performing edge detection on the resized image data representing one or more resized images (which can be gray-scale image data representing one or more gray-scale images) to identify a plurality of features, and two or more different colors can be applied to the features to convert the resized image data into smoothed color image data to recognize the features. For instance, a Canny filter can be used to highlight edges and define areas for recoloring from gray-scale to a reduced palette of colors. Similar noise removal and re-coloring can be applied to a copy of the target image 800 to maintain sizing and format similarity with the test images 904-910.

Figure 13:
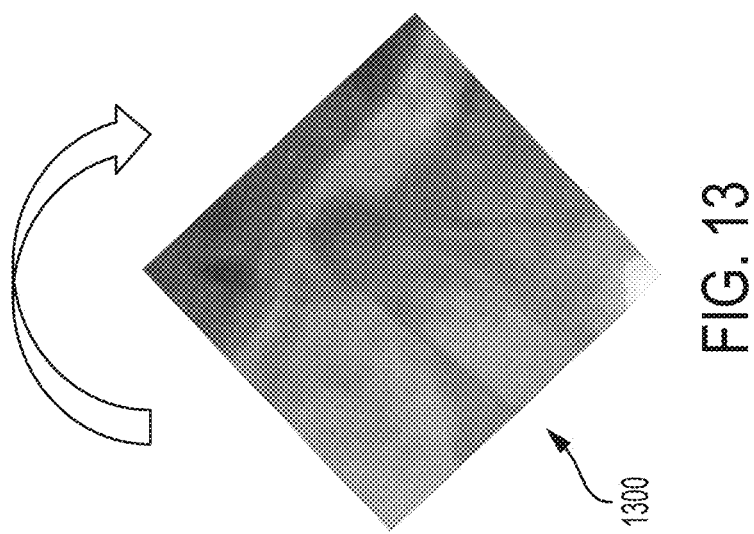
FIG. 13 depicts a target image rotated according to one or more embodiments of the present invention.
Figure 10:
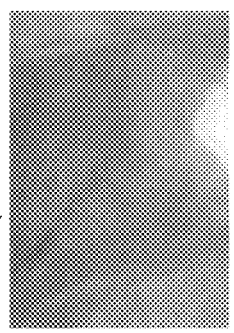
FIG. 10 depicts a test image according to one or more embodiments of the present invention.
Figure 12:
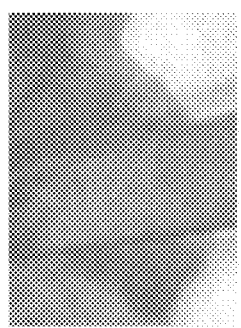
FIG. 12 depicts a test image according to one or more embodiments of the present invention.
Figure 9:
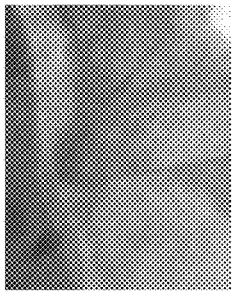
FIG. 9 depicts a test image according to one or more embodiments of the present invention.
Figure 11:
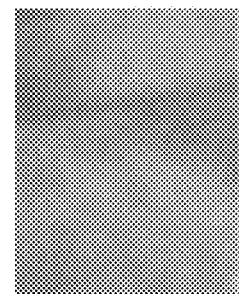
FIG. 11 depicts a test image according to one or more embodiments of the present invention.

At block 508, processor 101 can perform a best fit analysis on the test image data representing test images 904-910 with respect to the target image data representing target image 800 as part of the image processing 414. The best fit analysis can include image shifting and/or rotation. Target image 1300 of FIG. 13 depicts an example of a rotated version of the target image 800 without scale bar 802 for comparison. The image processing 414 can determine a difference value between test image data of each of the test images 904-910 and target image data of the target image 800, incrementally rotate either the test image data representing test images 904-910 or target image data representing the target image 800, determine a difference value after rotation, and identify the best fit as one of the test images 904-910 having a lowest difference value in comparison to the target image data of the target image 800 after rotation. Thus, no matter the orientation differences between the test images 904-910 and the target image 800, the image processing 414 can discover a best matching orientation and closest image match between the test images 904-910 and the target image 800.

At block 510, test image data representing one or more of the test images 904-910 having the best fit can be stored with training image data representing classification training images 406 indicative of one or more recognized features. At block 512, the training image repository 404 including a plurality of classification training images 406 can be formed based at least in part on identifying a plurality of test images 904-910 as best fit with respect to a plurality of target images 418 indicative of a plurality of recognized features. For example, the training image repository 404 can be formed by repeating the process steps of blocks 502-512 for a plurality of test images 904-910 as best fit with respect to a plurality of target images 418 indicative of a plurality of recognized features. The recognized features include physical characteristics identified as 'good'/expected results and examples of known anomalies.

At block 514, the anomaly detector 408 can be trained using machine learning based at least in part on the training image data representing the classification training images 406 in the training image repository 404. For example, one or more known machine learning techniques can be applied to map groups of similar features in the training image repository 404 to support feature identification and classification as unclassified images 410 are received. Training for structural and defect recognition can enable the anomaly detector 408 to both identify features within an image and determine which target type the feature most closely matches (e.g., an open circuit, a short circuit, good yield, and the like).

At block 516, an anomaly 412 can be identified in unclassified image data representing an unclassified image 410 based at least in part on the anomaly detector 408 as trained using the classification training images 406. A number of examples are depicted schematically in FIGS. 14-18 after processing for noise removal. For instance, post-processed image 1400 of FIG. 14 is an example of a 'good' or expected combination of physical characteristics for features related to gate formation. Post-processed image 1500 of FIG. 15 is an example of an open circuit 1502 as an anomaly in physical characteristics. Post-processed image 1600 of FIG. 16 is an example of a short circuit 1602 as an anomaly in physical characteristics. Post-processed image 1700 of FIG. 17 is an example of a tapered structure 1702 as an anomaly in physical characteristics. Post-processed image 1800 of FIG. 18 is an example of thin work function metal 1802 as an anomaly in physical characteristics. Other example for various types of observable structures and associated anomalies will be apparent to one of ordinary skill in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for anomaly detection, the method comprising:
    reading, by a processor, a scale in image data representing an image of a plurality of physical characteristics, wherein the scale is determined by reading pixel data of the image data into a two-dimensional matrix, dissecting the two-dimensional matrix to retain a scaling portion of the image data expected to graphically depict scaling information based on a known format, and analyzing the scaling portion of the image data expected to graphically depict scaling information to identify a legend label;
    resizing, by the processor, at least a portion of the image data to align with target image data representing a target image of one or more structures based at least in part on the scale to form resized image data representing one or more resized images;
    applying, by the processor, noise reduction to the resized image data to produce test image data representing one or more test images;
    performing, by the processor, a best fit analysis on the test image data with respect to the target image data to determine a best fit;
    storing the test image data of at least one of the test images having the best fit with training image data representing a plurality of classification training images indicative of one or more recognized features; and
    identifying an anomaly in unclassified image data representing an unclassified image based at least in part on an anomaly detector as trained using the classification training images.

2. The computer-implemented method of claim 1, wherein the anomaly detector is trained for structural and defect recognition using machine learning based at least in part on the training image data representing the classification training images.

3. The computer-implemented method of claim 1, wherein analyzing the portion of the image data expected to graphically depict scaling information comprises building a training set of data to recognize a plurality of different legend labels.

4. The computer-implemented method of claim 1, further comprising:
    extracting, by the processor, a plurality of image cuts from the image data by identifying a central portion of the image and randomly selecting a plurality of image blocks in proximity to the central portion of the image.

5. The computer-implemented method of claim 4, wherein resizing at least a portion of the image data comprises selecting a size of the image blocks to match a pixel count of the target image data.

6. The computer-implemented method of claim 1, wherein the resized image data comprise gray-scale image data representing one or more gray-scale images and applying noise reduction comprises:
    performing edge detection with filtering on the gray-scale image data to identify a plurality of features comprising one or more of the physical characteristics that are at least partially observable in the gray-scale image data; and
    applying two or more different colors to the plurality of features through re-coloring to convert the resized image data into smoothed color image data to highlight the plurality of features.

7. The computer-implemented method of claim 1, wherein performing the best fit analysis on the test image data with respect to the target image data comprises:
    determining a difference value between the test image data and the target image data;
    incrementally rotating either the test image data or the target image data and determining the difference value after rotation; and
    identifying the best fit as the test image data representing one of the test images having a lowest difference value in comparison to the target image data after rotation.

8. A computer program product for anomaly detection, the computer program product comprising:
    a non-transitory computer readable storage medium readable by a processing circuit and storing program instructions for execution by the processing circuit for performing:

reading a scale in image data representing an image of a plurality of physical characteristics, wherein the scale is determined by reading pixel data of the image data into a two-dimensional matrix, dissecting the two-dimensional matrix to retain a scaling portion of the image data expected to graphically depict scaling information based on a known format, and analyzing the scaling portion of the image data expected to graphically depict scaling information to identify a legend label;

resizing at least a portion of the image data to align with target image data representing a target image of one or more structures based at least in part on the scale to form resized image data representing one or more resized images;

applying noise reduction to the resized image data to produce test image data representing one or more test images;

performing a best fit analysis on the test image data with respect to the target image data to determine a best fit;

storing the test image data of at least one of the test images having the best fit with training image data representing a plurality of classification training images indicative of one or more recognized features; and identifying an anomaly in unclassified image data representing an unclassified image based at least in part on an anomaly detector as trained using the classification training images.

9. The computer program product of claim 8, wherein the anomaly detector is trained for structural and defect recognition using machine learning based at least in part on the training image data representing the classification training images.

10. The computer program product of claim 8, wherein analyzing the portion of the image data expected to graphically depict scaling information comprises building a training set of data to recognize a plurality of different legend labels.

11. The computer program product of claim 8, wherein the program instructions are further executable to cause the processing circuit to:

extract a plurality of image cuts from the image data by identifying a central portion of the image and randomly selecting a plurality of image blocks in proximity to the central portion of the image.

12. The computer program product of claim 8, wherein the resized image data comprise gray-scale image data representing one or more gray-scale images and applying noise reduction comprises:

performing edge detection with filtering on the gray-scale image data to identify a plurality of features comprising one or more of the physical characteristics that are at least partially observable in the gray-scale image data; and applying two or more different colors to the plurality of features through re-coloring to convert the resized image data into smoothed color image data to highlight the plurality of features.

13. The computer program product of claim 8, wherein performing the best fit analysis on the test image data with respect to the target image data comprises:

determining a difference value between the test image data and the target image data;

incrementally rotating either the test image data or the target image data and determining the difference value after rotation; and identifying the best fit as the test image data representing one of the test images having a lowest difference value in comparison to the target image data after rotation.

14. A processing system for anomaly detection, comprising:

one or more types of memory; and at least one processor communicatively coupled with the one or more types of memory, the at least one processor configured to:

read a scale in image data representing an image of a plurality of physical characteristics, wherein the scale is determined by reading pixel data of the image data into a two-dimensional matrix, dissecting the two-dimensional matrix to retain a scaling portion of the image data expected to graphically depict scaling information based on a known format, and analyzing the scaling portion of the image data expected to graphically depict scaling information to identify a legend label;

resize at least a portion of the image data to align with target image data representing a target image of one or more structures based at least in part on the scale to form resized image data representing one or more resized images;

apply noise reduction to the resized image data to produce test image data representing one or more test images;

perform a best fit analysis on the test image data with respect to the target image data to determine a best fit;

store the test image data of at least one of the test images having the best fit with training image data representing a plurality of classification training images indicative of one or more recognized features; and identify an anomaly in unclassified image data representing an unclassified image based at least in part on an anomaly detector as trained using the classification training images.

15. The processing system of claim 14, wherein the anomaly detector is trained for structural and defect recognition using machine learning based at least in part on the training image data representing the classification training images.

16. The processing system of claim 14, wherein the at least one processor is configured to extract a plurality of image cuts from the image data by identifying a central portion of the image and randomly selecting a plurality of image blocks in proximity to the central portion of the image.

17. The processing system of claim 14, wherein the resized image data comprise gray-scale image data representing one or more gray-scale images and the noise reduction comprises:

performing edge detection with filtering on the gray-scale image data to identify a plurality of features comprising one or more of the physical characteristics that are at least partially observable in the gray-scale image data; and applying two or more different colors to the plurality of features through re-coloring to convert the resized image data into smoothed color image data to highlight the plurality of features.

18. The processing system of claim 14, wherein the best fit analysis performed on the test image data with respect to the target image data is determined by:
- determining a difference value between the test image data and the target image data;
- incrementally rotating either the test image data or the target image data and determining the difference value after rotation; and
- identifying the best fit as the test image data representing one of the test images having a lowest difference value in comparison to the target image data after rotation.

* * * * *